United States Patent [19]

Miller

[11] 4,053,413
[45] Oct. 11, 1977

[54] APPARATUS FOR REMOVING PARTICLES FROM WATER FOR SPRINKLERS AND THE LIKE

[76] Inventor: John M. Miller, Rte. 1, Box 273, Rocky Ford, Colo. 81067

[21] Appl. No.: 632,310

[22] Filed: Nov. 17, 1975

[51] Int. Cl.² .......................................... B01D 33/02
[52] U.S. Cl. ....................................... 210/104; 61/25; 210/158; 210/161; 210/416 R
[58] Field of Search ............... 210/153, 154, 155, 156, 210/157, 158, 159, 160, 161, 170, 402, 404, 409, 416, 104; 61/12, 25, 29

[56] References Cited

U.S. PATENT DOCUMENTS

| 793,720 | 7/1905 | Godbe | 210/402 X |
| 978,468 | 12/1910 | Merritt | 61/25 |
| 1,011,120 | 12/1911 | Collar | 61/25 |
| 1,188,340 | 6/1916 | Tark | 210/161 X |
| 1,195,875 | 8/1916 | Tohms | 210/402 |
| 2,839,194 | 7/1958 | Lopker et al. | 210/402 UX |
| 3,217,497 | 11/1965 | Humphreys et al. | 61/25 |
| 3,347,379 | 10/1967 | Miller | 210/402 X |
| 3,349,916 | 10/1967 | Magson | 210/161 X |
| 3,468,423 | 9/1969 | Pechon | 210/402 |
| 3,874,176 | 4/1975 | Shettel | 61/25 |

*Primary Examiner*—Theodore A. Granger
*Attorney, Agent, or Firm*—Horace B. Van Valkenburgh; Frank C. Lowe

[57] ABSTRACT

A fine mesh, cylindrical screen is mounted on a cylindrical support lengthwise of a ditch and rotated about its axis. The screen is over half submerged, such as leaving 30% of its area above the normal water level. The rotating screen, at its downstream end, abuts the pipe through which the water flows to a pump for supplying the sprinklers.

As the screen rides up out of the water, the sediment clings to it. At the downstream end is a nozzle which discharges a jet of water to move the sediment longitudinally and to a position of engagement with a jet of water from a second nozzle spaced both longitudinally and circumferentially from the first nozzle. These nozzles are included in a series of nozzles which are similarly spaced to the upstream end, with the jet from the last nozzle moving the collected sediment to a position engageable by a suction nozzle just before the screen reenters the water.

A special dam downstream from the screen normally insures that the water at the screen will be at the desired level. However, this dam is actuated automatically, as through a periodic timing device and limit switches for a reversible motor drive. A cable is connected to the lower edge of a lower portion of the dam, which is pivotally connected to the upper portion thereof, in turn pivotally mounted. As the cable is initially moved, the lower pivotal portion of the dam will be moved upwardly to flush the lower portion of the stream first and thereby flush sediment collected beneath the screen. As the cable moves further upwardly, the lower portion engages a stop mounted on the upper portion, so that the two portions will then be moved upwardly together in unison, to flush the entire stream.

15 Claims, 12 Drawing Figures

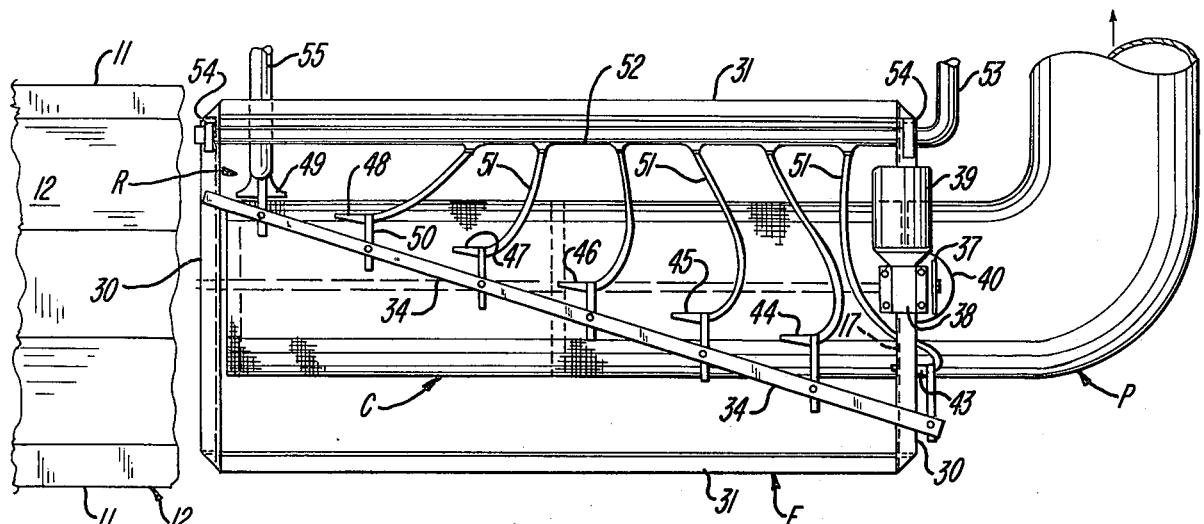
Fig _ 1
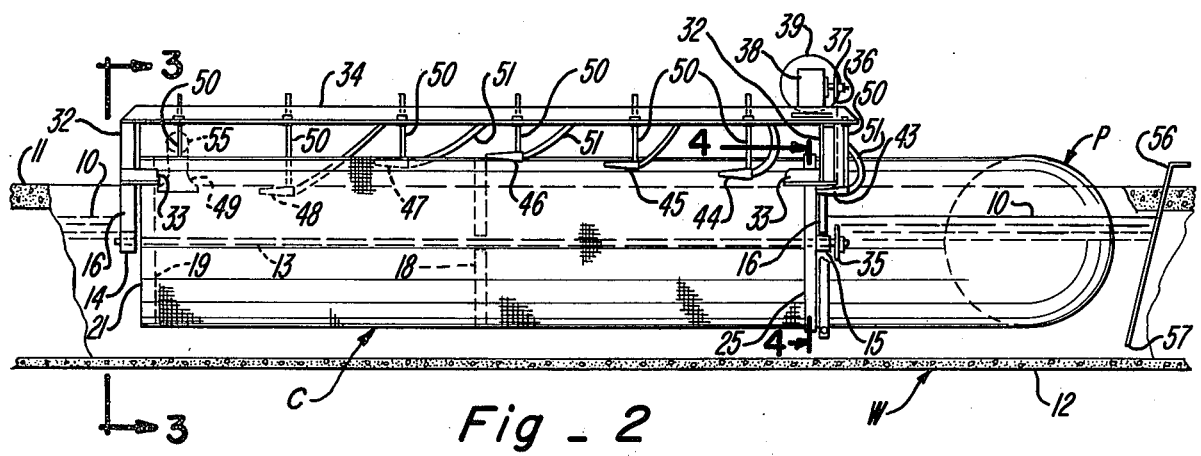
Fig _ 2
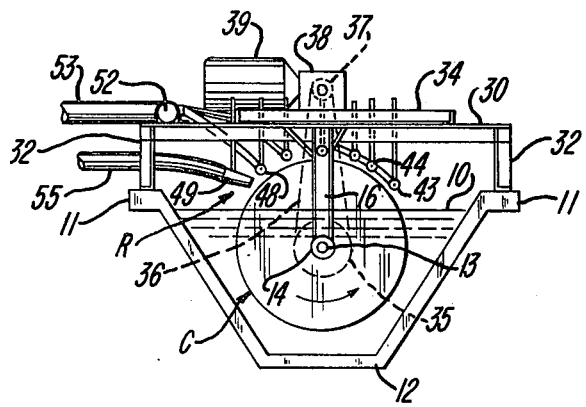
Fig _ 3
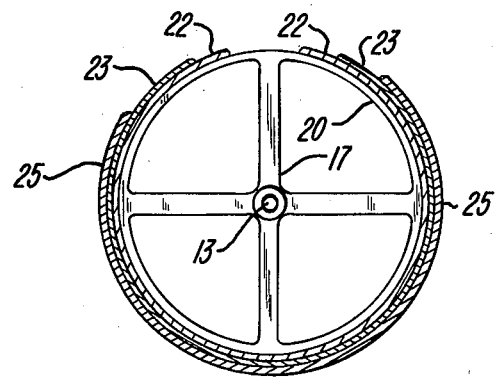
Fig _ 4

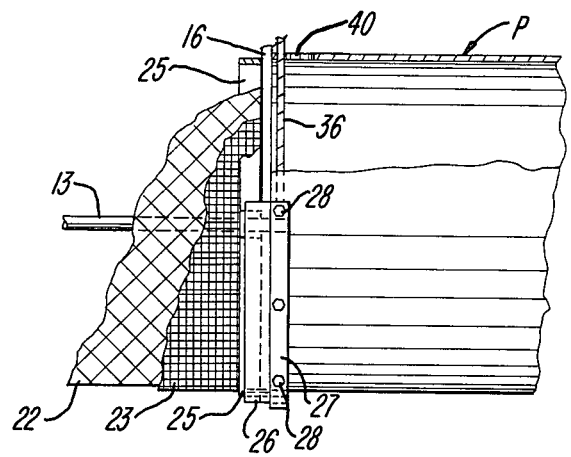
Fig_5
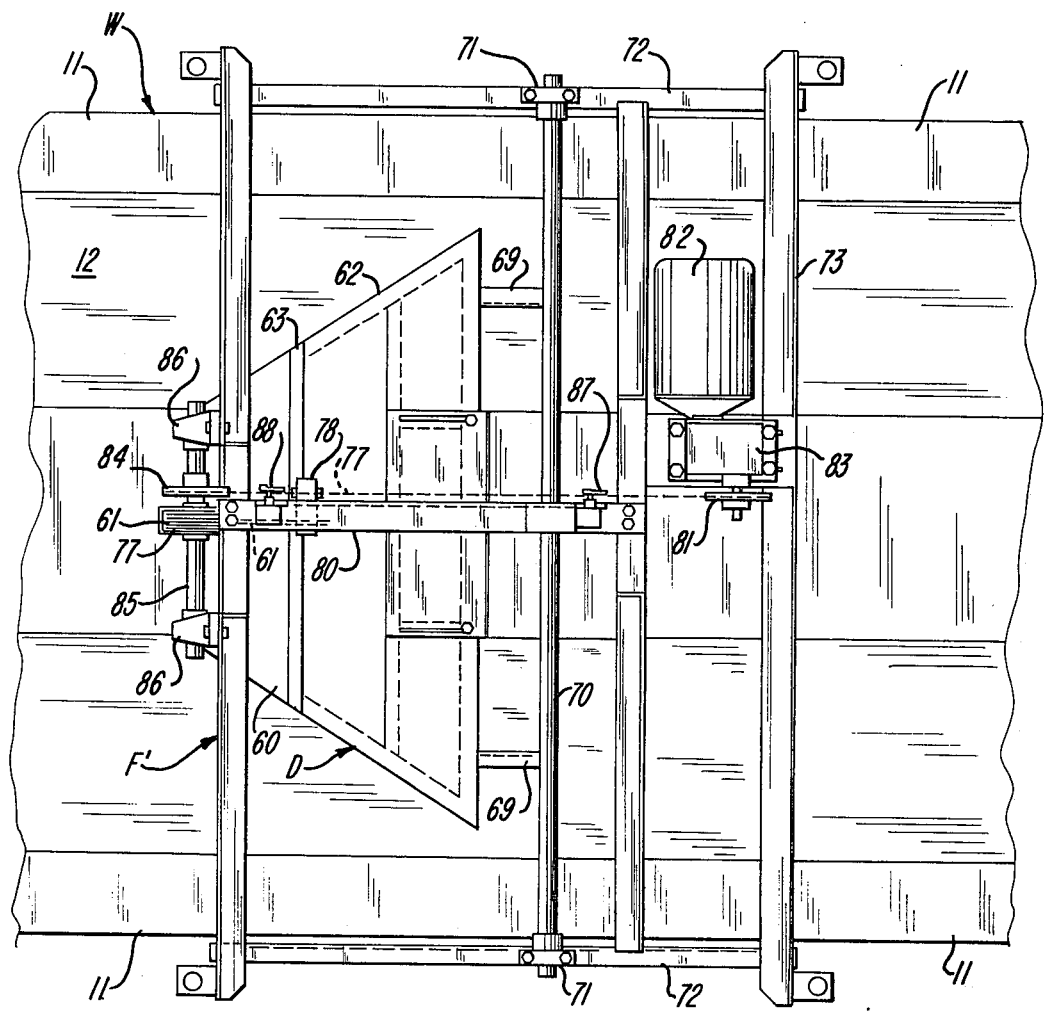
Fig_6

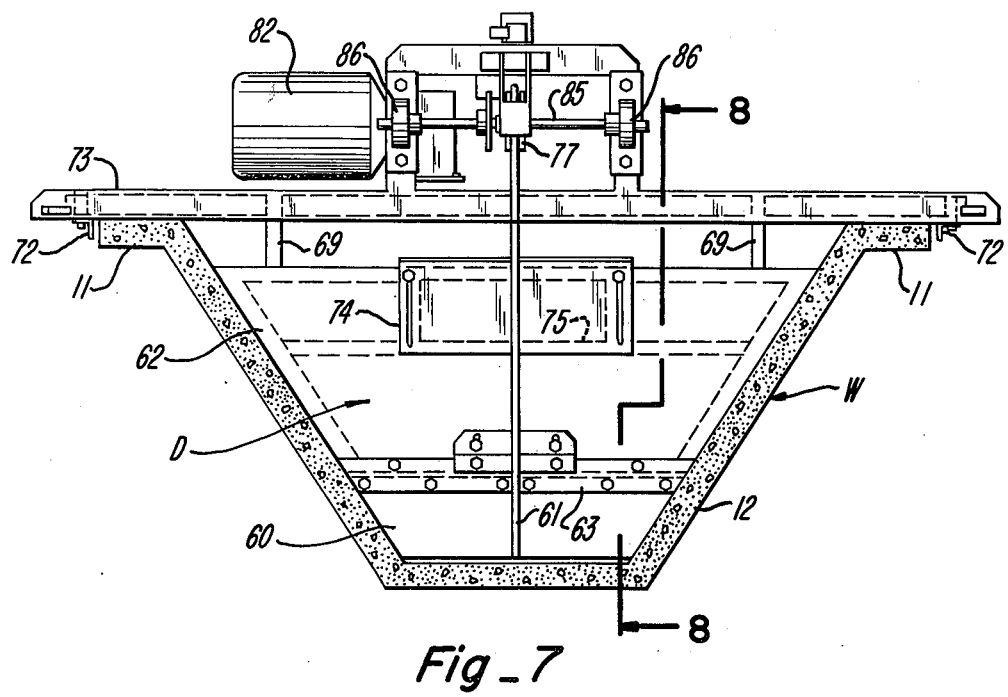
Fig_7
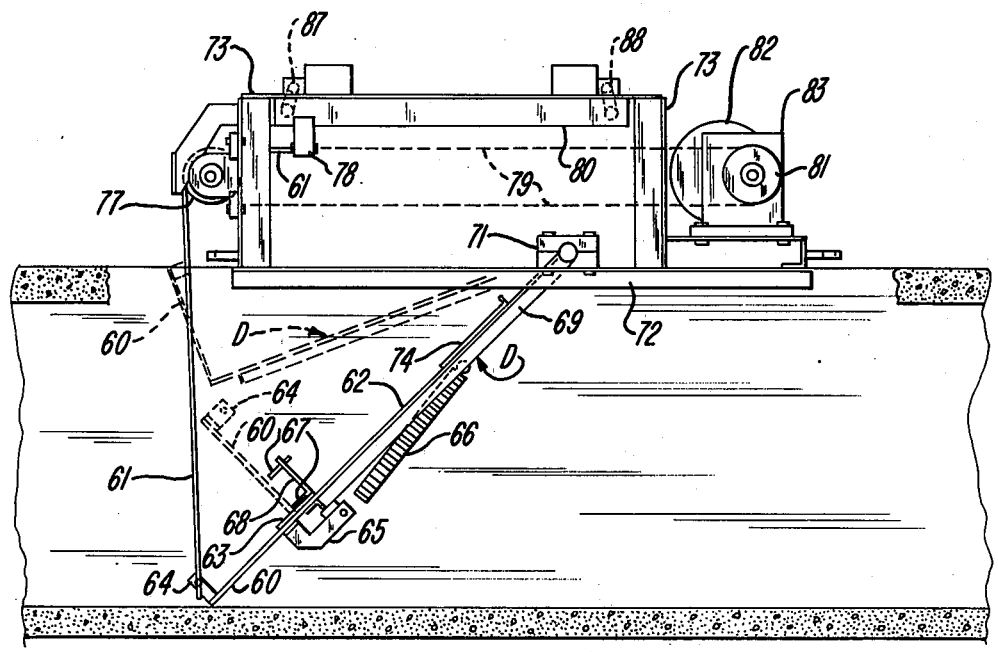
Fig_8

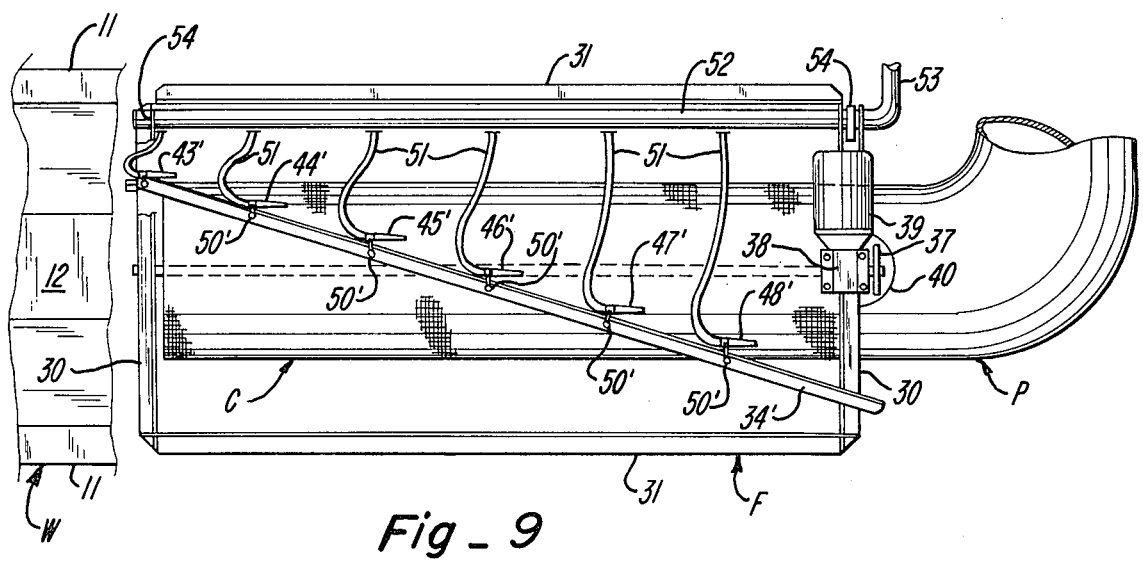
Fig_9
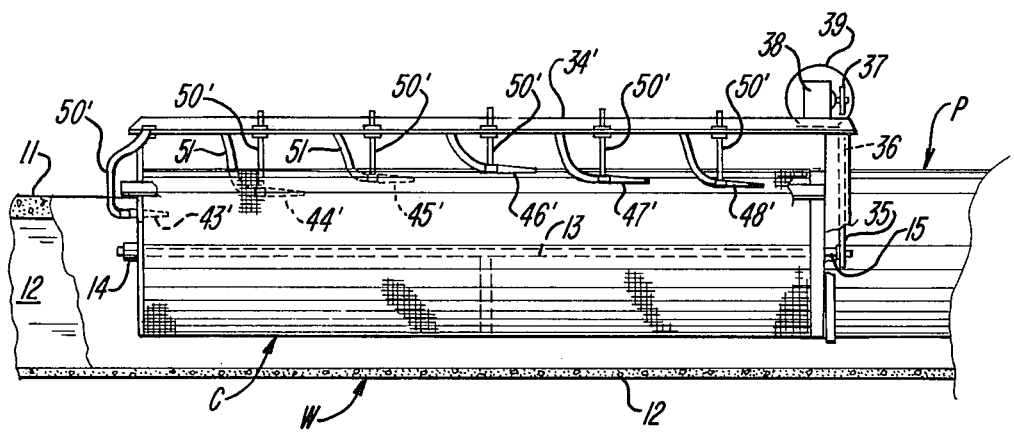
Fig_10
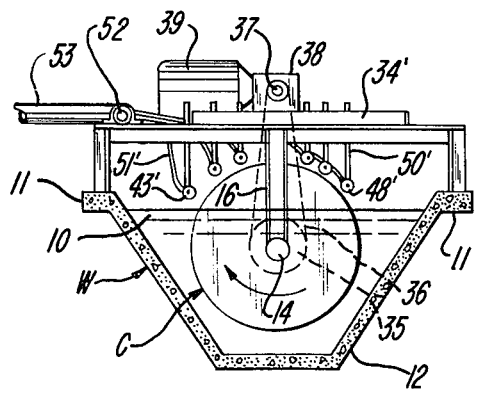
Fig_11
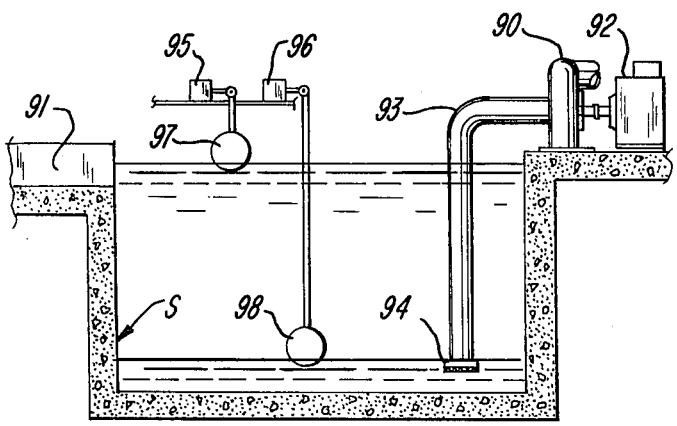
Fig_12

APPARATUS FOR REMOVING PARTICLES FROM WATER FOR SPRINKLERS AND THE LIKE

This invention relates to apparatus for removing particles from water for spinklers and the like.

There are, in general, two types of sprinkling apparatus which are adapted to irrigate relatively large tracts of land. One type rotates about a center pivot and has a plurality of wheeled supports which rotate in circles about the center pivot and which support a portion of an elongated water carrying pipe which extends from the center pivot to the outer end, a distance sometimes of over 1300 feet. Water sprinklers, either of the rotating or reciprocating type, are placed at calculated intervals along the main pipe, the spacing between the sprinklers and the capacity of each of the spinklers being proportioned to the distance from the center, since a spinkler adjacent the outer end of the pipe is required to cover an annular area many times larger than a sprinkler adjacent the center pivot.

In another type of sprinkling device, a series of stationary, parallel elongated pipes are spaced apart a distance corresponding to the capacity of the sprinklers there, being moved from one position to another position as the ground becomes sufficiently irrigated. These pipes also have spinklers, of either the rotating or the reciprocating type, but in this type of apparatus, the spinklers are usually all substantially the same size, since the area to be covered by each sprinkler will be substantially the same. Because they are self-driven and can normally operate both day and night without attention, other than periodic inspection, the self-propelled rotary type has become highly popular.

For either type, each sprinkler is provided with a carefully gauged bore to monitor accurately the amount of water discharged through that sprinkler. Some of these bores are of a relatively small diameter and can readily be clogged by sediment and small particles in the water supply to the sprinkling device. Even larger sizes of sprinkler bores may sometimes become clogged by sediment or particles Thus, one difficulty encountered with the sprinkling apparatus is plugging of one or more sprinklers, particularly the smaller bore sprinklers. This requires the water to be turned off, at least the water to the sprinkler involved, if a value for that purpose is present, the cleaning or replacement of the sprinkler. Such sediment and particles are particularly present when the feed to the pump which supplies the sprinkling apparatus, is from an irrigation ditch, rather than a well. A screen in the feed water pipe for the pump may be used to intercept sediment or particles of a size which would produce difficulty, but if the sediment or particles are present in any appreciable quantity, such a screen requires frequent cleaning and shutdown of the pump at such times.

It is an important object of the present invention to provide apparatus for treating water carrying sediment or particles in such a way as to remove the particles down to a size smaller than that which will tend to clog even the smallest sprinkler bore. The apparatus of the present invention may be utilized in conjunction with the apparatus of my copending application Ser. No. 541,715 filed Jan. 17, 1975 and entitled "Trash Catching Device", now U.S. Pat. No. 3,976,573 which removes larger particles and objects, such as leaves, brush and the like, as well as other trash, through a heavy screen which is moved into and out of the water, as in a ditch. However, the particles which escape through the screen of the trash collecting device, while innocuous to normal irrigation procedures, can still produce difficulty in a sprinkling irrigation device using sprinklers.

It is thus a further object of this invention to provide a device having a relatively fine screen through which flows the water, which is led to the pump for producing the desired pressure of water for a relatively large number of sprinklers and, in s doing, trap the sediment or particles which could be disadvantageous in the operation of the sprinklers.

A further object of this invention is to provide a fine mesh screen through which a small pressure differential may be produced when the screen is moved through the water, so that particles will ride with the screen as it moves out of the water.

A still further object of this invention is to provide adequate means for transfer of the collected sediment and particles on the screen to a point of collection and removal.

Normally, the apparatus of this invention will not encounter trash, such as leaves, limbs and the like, but may do so. Thus, still another object of this invention is to provide for the retention and removal of minor amounts of such larger objects.

It will be evident that, as the water to be pumped to the sprinkler passes through the screen and sediment or particles carried thereby are deposited on the screen, the concentration of sediment and particles in the remaining water will increase, so that there is a possibility of sediment and particles dropping out by gravity from the remaining water, to collect in the ditch beneath the screen. This is true, even though the screen is moved through the water. Thus, a still further object of this invention is to provide such apparatus which will purge the portion of the ditch beneath the screen device of this invention, so that a collection of sediment or other deposit in the ditch will not tend to interfere with the proper operation of the screen.

A further object of this invention is to provide a novel dam which will normally cause the sediment screen to be more fully submerged and then, at intervals, will produce an initial flow along the bottom of the ditch for adequate removal of collected sediment beneath the screen, then a dropping of the water level and a faster rate of flow of the water past the screen, so as to purge any water loaded with sediment or particles.

The foregoing and additional objects of this invention, as well as the novel features thereof, will become apparent from the following description, taken with reference to the accompanying drawings, in which:

FIG. 1 is a top plan view of a sediment collector constructed in accordance with this invention and installed in a concrete lined ditch.

FIG. 2 is an elevation of the apparatus shown in FIG. 1 taken from the right side thereof, with the ditch broken away and in section.

FIG. 3 is a cross section taken along line 3—3 of FIG. 2, showing essentially the upstream end of the apparatus.

FIG. 4 is a cross section taken along line 4—4 of FIG. 2, showing particularly a screen cylinder forming part of the apparatus.

FIG. 5 is a fragmentary detail showing particularly a seal between the downstream end of the screen cylinder and the abutting end of the pipe through which the treated water flows to a pump.

FIG. 6 is a top plan view of a special dam placed downstream from the cylinder and utilized either to maintain a desired level of water around the cylinder or to flush down the ditch residual particles or debris which may fall from the screen back into the ditch.

FIG. 7 is an upstream elevation of the dam of FIG. 6.

FIG. 8 is a side elevation of the dam taken along line 8—8 of FIG. 7.

FIG. 9 is a top plan view similar to FIG. 1 but showing an alternative embodiment.

FIGS. 10 and 11 are respectively an elevation similar to FIG. 2 and a cross section similar to FIG. 3, but showing the embodiment of FIG. 9.

FIG. 12 is a vertical section of a cistern or sump for the pump serving the sprinkler or the like.

Apparatus constructed in accordance with this invention, as in FIGS. 1-3, may be installed in a water ditch W and may include a horizontal screen cylinder C disposed lengthwise in the ditch and rotated about its longitudinal axis. As the cylinder C rotates, the water 10 in the ditch, which in normal operation may be up to a level above the center of the cylinder, as in FIG. 2, flows through the screen and inside the screen to a pipe or conduit P which abuts the downstream end of the cylinder and by which the water is led to the pump which supplies the sprinkling apparatus. As the water flows through the screen to pipe P, a pressure differential between the water in the ditch and the water inside the screen is provided. Thus, the sediment and particles removed from the water as the water passes through the screen are deposited on the screen and tend to remain on the screen as successive portions of the screen move upwardly and above the water level. As the first step in removal of the deposit of sediment from the screen, a moving means M, such as a series of nozzles described later, moves the sediment along the cylindrical screen, conveniently in an upstream direction, with water or other fluid discharged by each nozzle moving the sediment upon which it impinges longitudinally upstream of the screen to the next nozzle, which will move the sediment a further increment of distance longitudinally of the screen, until the last nozzle moves the sediment to a removal means R, such as a suction device.

The rotation cylinder C is suspended from a framework F, in turn supported by the side extensions 11 of the concrete lining 12 of the water ditch W, the ditch being so lined in order to prevent any increase in the sediment and particles in the water, such as might be received from an unlined bank of a ditch. The cylinder C is mounted on a central shaft 13 which is supported at one end by an upstream bearing 14 and at the other end by a downstream bearing 15, each bearing being mounted in a hanger 16 suspended from the frame F. Mounted on the center shaft 13 are a downstream hub 17, a central hub 18 and an upstream hub 19, each of the hubs, as in FIG. 4, having a central bore for the shaft, spaced radial arms and an outer rim 20. Although the upstream end of the cylinder may be screened, it is preferable to provide a plate 21 as a cover therefor, to obviate the necessity for cleaning collected sediment from the upstream end.

A cylindrical screen support 22, conveniently formed of expanded metal, surrounds the hubs 17, 18 and 19 and may be tack welded or otherwise secured in a suitable manner to the peripheral rims 20 of the hubs. The screen support 22 may, for instance, be formed by rolling a rectangular section of expanded metal of appropriate size into a circular shape and then clamping against the hubs while tack welding to the hubs. The expanded metal may also be tack welded along the longitudinal abutting edges. If desired, a longitudinal bar may extend between the hubs and the longitudinal abutting edges of the screen support tack welded thereto. As will be evident, the expanded metal of the screen support provides many holes for the flow of water therethrough.

Surrounding the screen support is a screen 22 having a relatively fine mesh, such as from 10 to 14 mesh per inch. This fine mesh screen is conveniently made of stainless steel wire, as of approximately 0.025 inch in diameter, with an approximate open area of around 55%. The fine mesh screen may be wrapped around the screen support in overlapping sections, with the overlap preferably being an upstream section overlapping a downstream section. At the overlap of the sections the screen may be held in position by a heavy wire tightened around the cylinder. If desired, a longitudinal strip may be placed over the circumferentially overlapping ends of the screen sections, with this strip being tightened against the screen sections by the clamping wires. If a screen of a size capable of doing so may be obtained, two screen sections may be utilized with their longitudinal overlap at the center hub 18. The fine mesh screen may also be tack welded to the expanded metal screen support and overlapping screen sections tack welded together.

The cylinder C preferably has an exterior diameter corresponding to that of the pipe P, so that a smooth ring 25 of FIG. 5 may be placed over the screen at the downstream end, for engagement with an overlapping rubber seal ring 26 mounted on the pipe P by a clamp 27, in turn attached to the pipe by bolts 28. The seal ring 26 need not extend completely around the pipe P, but may extend a distance above the centerline of the pipe corresponding to the normal level of water 10, with perhaps an additional distance, as a precautionary measure. The frame F, as in FIGS. 1-3, includes end bars 30, side bars 31, upstanding legs 32 and lower side bars 33 resting on the respective side extensions 11 of the ditch lining. A top bar 34 extends angularly between the end bars, as in FIG. 1, for the purpose of supporting the moving means M, in a manner described later.

For rotation of cylinder C, a sprocket 35 is mounted on the downstream end of the cylinder shaft 13, as shown in dotted lines in FIG. 2, sprocket 35 being connected by a chain 36 with an upper sprocket 37 of FIG. 1 mounted on and driven by a speed reducer 38, in turn driven by a motor 39. The motor and speed reducer are mounted on the downstream end bar 30 of the frame F. To accommodate the chain 36, as well as to accommodate the downstream bearing hanger 16, a hole 40 is provided in the top of pipe P. The cylinder C is rotated in a counterclockwise direction, when viewed from the upstream end, as in FIG. 3, at a slow rate, on the order of 6 to 8 r.p.m. for a cylinder diameter on the order of 16 inches. The cylinder may be on the order of 6 feet to 8 or 9 feet long.

The nozzles 43 to 48, inclusive, of the sediment moving means M are spaced apart lengthwise of the screen from the downstream to the upstream end and circumferentially of the screen, beginning at the downstream side as the screen leaves the water and extending over to the upstream side before the screen passes again into the water. Thus, the nozzle 43 is disposed adjacent the downstream end of the cylinder C a short distance above the point at which the screen leaves the water. Nozzle 43 directs a jet of water lengthwise of the screen and impells sediment collected on the screen toward the upstream end of the cylinder and for a distance sufficient that the thus impelled sediment, together with additional sediment on the screen forwardly thereof, to the next nozzle 44, which is both longitudinally and circumferentially spaced from the nozzle 43 in an angularly upward direction. Water from nozzle 44 will impinge upon this collected sediment and additional sediment within its influence. This sediment will be pushed longitudinally of the screen a sufficient distance that, as the screen continues rotation, the thus impelled sediment will be forwardly of the next angularly upwardly disposed nozzle 45, which similarly impells the collected sediment and additional sediment on the screen moving upwardly from the water line, to the influence of a nozzle 46. As shown, nozzle 46 is located at the top center of the screen, although the number of nozzles and the spacing thereof may be varied from that shown. Nozzle 46 again impells the collected, previously impelled sediment, as well as additional sediment collecting on the screen as it moves out of the water, toward the influence of the next nozzle 47, which is on the down slope of the screen, after it passes over center. Nozzle 47 similarly impells previously impelled and further collected sediment to a position longitudinally of the screen for impingement by the stream of water from nozzle 48, which again impells the sediment longitudinally to a point of pickup by the removal means R, which includes a suction nozzle 49. Each of the nozzles 43 to 48, inclusive, is mounted on an angular bracket 50 which depends from the top bar 34 of the frame F and is adjustably attached thereto. The nozzles 43–48, inclusive, are shown as being essentially parallel to the cylinder, but it will be understood that the nozzles may be directed toward the surface of the cylindrical screen, if desired. Each of the nozzles is supplied by a hose 52 which extends from a manifold 52 to which water is supplied from a pump (not shown) through a pipe 53. Manifold 52 is mounted on the frame F, as by ring clamps 54 attached to the respective end bars 30. A hose 55 leads from suction nozzle 49 to a source of suction (not shown) and a suitable place for collection of the removed sediment.

It will be understood, of course, that the nozzles may move the collected sediment from the downstream end of the cylinder across and over the cylinder and to the upstream end, at which the force of the jet nozzle 44 may be used to propel sediment into a transverse trough, from which the sediment may be removed, as with a jet booster, to a percolation field near the bank, to permit excess water to drain back into the ditch.

A plate dam 56 may be placed downstream from the cylinder C, to insure an adequate level of water at the screen, with the bottom edge 57 of the dam 56 spaced from the bottom of the ditch, to permit a continuous flow at the bottom to purge the bottom of the ditch. Also, the dam 56 may be periodically removed to purge the water around the screen of any undue concentration of sediment of particles.

Since the plate dam 56 requires considerable attention, an automatic dam D, illustrated in FIGS. 6–8, may be found preferable. In essence, the dam D is shaped to correspond to the contour of the lining 12 of the ditch, when disposed in an inclined position, as on the order of 45°, as shown, the dam D is provided with a lower pivoted segment 60, which is liftable upwardly to the dotted position of FIG. 8 at appropriate intervals by a cable 61, for flushing out the bottom portion of the water in the ditch, as to remove collected sediment beneath the screen.

The dam D also includes an upper segment 62 which may be pivoted upwardly to the dotted position of FIG. 8 by a further upward movement of cable 61, with the lower segment 60 then reaching the upper dotted position of FIG. 8. A joint 63 of FIGS. 6 and 7 pivotally connects the lower segment 60 and the upper segment 62, while the lower end of cable 61 is connected to an attachment flange 64 at the lower edge of lower segment 60. The underside of the upper edge of segment 60 is connected by a bracket 65 with a tension spring 66, which insures that the segment 60 will reassume its downward position, when lowered thereto by the cable 61. Also, the upward pivotal movement of segment 60 is limited by adjustable stops 67 on a bracket 68 which upstands from the upper segment 62 adjacent the lower edge thereof. A pair of arms 69 connect the upper segment with a pivot shaft 70 extending between bearings 71 mounted on angles 72 which overhang the respective side extensions 11 of the ditch and are supported by a frame 73, which includes appropriate parts, such as angles, bars, beams and the like. An adjustable weir 74 is mounted adjacent the upper edge of segment 62 and may be adjusted upwardly to uncover a smaller or greater portion of a hole 75, as desired, to more effectively control the water level at the rotating screen cylinder, when necessary.

Cable 61 extends upwardly and over a pulley 77, being connected to a carriage 78 mounted on a link chain 79, with the upper end of the carriage being bifurcated to provide a slot engaging a guide bar 80 of FIG. 8. Chain 79 engages a sprocket 81 driven by a reversible motor 82 through a speed reducer 83. The opposite end of chain 79 engages a sprocket 84 spaced laterally from pulley 77, while sprocket 81 is in alignment with sprocket 84. Pulley 77 and sprocket 84 are mounted on a shaft 85 journaled in bearings 86 which, along with other parts, are supported by framework 73. When moving in one direction, carriage 78 will move until it trips a limit switch 87 of FIG. 8, while when moving in the opposite direction, carriage 78 will move until it trips a limit switch 88.

With the automatic dam D in the down position shown in FIG. 8, the reversible motor will be energized at an appropriate time by a conventional timing device (not shown) which may be set for periods of 20 minutes 3 minutes, 40 minutes or the like. When the motor 82 is energized to move the carriage 78 toward it, the lower segment 60 of the dam D will be moved to the lower dotted position of FIG. 8, in order to first flush the bottom of the ditch beneath the screen cylinder C. As the carriage moves further, the segment 60 will abut stops 67, so that the cable 61 will, while continuing upwardly, move the segment 60 and segment 62 together to the upper dotted position of FIG. 8. When the dam D reaches the upper dotted position of FIG. 8, the carriage 78 will trip limit switch 88 which will reverse the motor 82 and cause the carriage 78 to return to its initial position, thereby lowering the cable 61 and permitting the dam D to move downwardly to its original position. At that time, the carriage 78 will trip limit switch 87 which will stop the motor. The motor controls may be reversed at that time through control by limit switch 87 or the timing device which starts the motor may be connected so as to first reverse the directional control of the motor before starting the motor for the next sequence.

Although the exposed portion of the screen cylinder with the normal water level show may be on the order of 30% of the periphery of the cylinder, various other amounts of the screen above water level may be utilized.

In the embodiment illustrated in FIGS. 9–11, the cylinder C, framework F and the conduit pipe P, together with the parts thereof indicated by the same reference numerals, are essentially the same as in the embodiment of FIGS. 1–5. One essential difference is that the nozzles 43′ through 48′ are disposed about the periphery of the drum above the level of the water but pointing in a downstream direction, rather than an upstream direction, while the drum is rotated in the opposite direction from that of FIG. 3, as indicated by the arrow of FIG. 11, and the suction nozzle 49 which removes the accumulated sediment, as in FIGS. 1 and 3, is omitted. Thus, the initial movement 43′ is disposed adjacent the upstream end of the cylinder and directs a jet of water lengthwise and downstream of the cylinder to impel sediment collected on the screen toward the downstream end of the cylinder for a distance sufficient that the thus impelled sediment, together with additional sediment on the cylinder rearwardly thereof, is moved to the next nozzle 44′. In turn, each of the nozzles 44′, 45′, 46′ and 47′ propel the sediment received from preceding nozzles, as well as the sediment collecting on the screen at the circumferential area, downstream to the next nozzle. Finally, nozzle 48′ propels the sediment off the drum and back into the stream, but downstream from the drum.

The nozzles 43′ through 48′ are supported by angular brackets 50′ depending from a top bar 34′ which, in turn, is supported by the frame F which includes end bars 30 and side bars 31. Rinse water for the nozzles is supplied as before through a pipe 53 to manifold 52 and through hoses 51′ to the respective nozzles. The mechanism for rotating the drum is similar to that previously described, including a chain 36 extending over an upper sprocket 37 driven through a speed reducer 38 by a motor 39, while a semicylindrical hole 40 is produced in the top of pipe P, to accommodate the passage of drive chain 36, which also engages a lower sprocket 35 for the cylinder shaft 13.

In FIG. 12 is illustrated a cistern or sump S for a pump 90 which supplies water to the sprinkler. An inlet 91 of sump S is connected to the flow of water through pipe P. Pump 90 is driven by a motor 92 and is provided with an intake 93 having a filter 94 at its lower end, within the sump S. The walls of sump S may conveniently be formed of concrete, as shown. The dam drive motor 82 of FIGS. 7 and 8 may be controlled through microswitches 95 and 96. Thus, microswitch 95 is responsive to a float 97, in turn responsive to the water in sump S reaching an upper level, as shown, in order to close the microswitch and start the dam drive motor 82 in a direction which will elevate the dam D, which in turn will cause the level of water to be lowered to a point below screen C, thereby stopping the supply of water to sump S. The water level in sump S will then begin to fall until a lower level is reached. Thus, the microswitch 96 is responsive to a float 98, normally maintained at a lower position in the water in the sump and which will close the microswitch 96 in the event that the level of water in the sump approaches the lower end of intake pipe 93. Float 97 is thus adapted to close microswitch 96, to reverse dam drive motor 82 and thereby to lower the dam D into the ditch. This will produce a rise in the level of the water at cylinder C and a consequent resumption of the flow of water from cylinder C to sump S. Pump 90 not only supplies the sprinklers but also may supply the manifold 30′ for the nozzles 43′ to 48′, inclusive.

The sump S and the level responsive control thereof operate in combination with the dam D and screen C to open the dam periodically to flush downstream material washed off the cylinder by the nozzles, while providing the sprinkler pump with a stable volume of water. This requires, of course, for successful operation, that the supply of water from inside the screen cylinder be greater than the amount required by the sprinkler pump. For instance, assuming that the sprinkler and its pump require 1,000 gallons per minute, and the cistern has a capacity of approximately 1,200 gallons, an excess supply of 2,000 gallons per hour, over the sprinkler requirements, would automatically cause the dam D to be lifted and flush the screen system every 30 minutes.

Although preferred embodiments of the screen cylinder and associated parts, as well as the automatic flushing dam and pump sump, have been illustrated and described, it will be evident that other embodiments may exist and that various other changes may be made, all without departing from the spirit and scope of this invention.

What is claimed is:

1. Apparatus for removing sediment and particles from water in a ditch or the like and adapted to be pumped to a plurality of sprinklers, comprising:

a cylindrical screen disposed lengthwise of said ditch and mounted for rotation about its longitudinal axis;

a liquid withdrawal conduit constructed and arranged to receive water from the inside of said screen;

means for moving sediment and particles deposited on said screen in a direction generally longitudinally of said screen to a point of removal, said moving means including a series of fluid nozzles for directing a flow of fluid longitudinally against the outside of said screen above the water at paths spaced both longitudinally and circumferentially of said screen; and said nozzles being arranged so that each fluid nozzle, in turn, except the last will move said sediment and particles to the longitudinal path of the next nozzle as the screen rotates.

2. Apparatus as defined in claim 1, including:

means for removing deposited sediment and particles from said screen adjacent said last nozzle.

3. Apparatus as defined in claim 2, wherein:

said means for removing the collected sediment and particles includes a suction nozzle.

4. Apparatus as defined in claim 2, wherein:

the first of said fluid directing nozzles is disposed adjacent the emergence of said screen from said water and the last of said nozzles is disposed adjacent the reentry of said screen into the water 5. Apparatus as defined in claim 2, wherein:

the initial nozzle is disposed above the region at which the screen moves out of the water and at the downstream end of the screen; and the removal means is disposed at the upstream end of the screen above the region at which the screen reenters the water.

6. Apparatus as defined in claim 5, wherein said removal means comprises a suction nozzle at a position adjacent the upstream end of said cylinder above the position at which said cylinder reenters the water.

7. Apparatus as defined in claim 4, wherein:
said removal means is a nozzle directing fluid against said screen at the downstream end thereof and above the region at which the screen reenters the water, for flushing collected sediment and particles back into the water essentially downstream of said screen.

8. In the combination in a ditch, of a rotating cylindrical screen for removing sediment and particles from water through flow of water from the outside to the inside of said screen and dam means downstream of said screen, which is adapted to be periodically moved from a position in which the screen is more than half submerged and a position in which debris collected beneath said screen is flushed downstream, and dam means comprising:
an upper portion extending across said ditch;
pivot means for said upper portion transverse to said ditch;
a lower portion extending across said ditch and pivotally attached to said upper portion by a transverse hinge;
a stop mounted on said upper portion for limiting the upward movement of said lower portion relative to said upper portion;
cable means attached to the lower end of said lower portion for raising said lower portion to permit flushing of sediment under said screen, said cable moving said lower portion and said upper portion upwardly together after said lower portion engages said stop; and
means for periodically raising and periodically lowering said cable means.

9. Dam means as defined in claim 8, including:
a member reciprocable between two positions and attached to the opposite ends of said cable means;
reversible drive means for said member for moving said member between said positions; and
means for shutting off or reversing said motor when said member reaches the respective ends of its path of travel.

10. In combination with apparatus as defined in claim 1:
a conduit for leading treated water to a pump or the like, said conduit having an open end abutting the downstream end of said cylindrical screen; and
sealing means between the downstream end of said rotating screen and said conduit.

11. The combination set forth in claim 10, wherein said sealing means includes:
a flexible strip attached to said conduit; and
a smooth ring on the outside of the downstream end of said cylinder engaging said strip.

12. The combination defined in claim 10, including:
downwardly extending drive means for rotating said screen;
a downwardly extending support for said screen; and
an aperture in the top of said conduit through which said drive means and said support means extend.

13. Apparatus as defined in claim 1, mounted in a ditch and including:
a frame for supporting said cylindrical screen and engaging a top side wall of said ditch;
a horizontal shaft disposed centrally of said cylindrical screen;
hubs connecting said shaft with the inside of said screen;
a bearing at each end of said shaft exteriorly of said cylindrical screen;
a support depending from said frame at each of the upstream and downstream ends of said screen, each support carrying a bearing for said shaft;
a sprocket mounted on the downstream end of said shaft;
a motor driven sprocket mounted on said frame above the top of said conduit;
a chain extending around said upper and lower sprockets for rotating said screen;
one end of said screen cylinder abutting a conduit for conveying water away from the inside of said screen; and
an aperture in the top wall of said conduit to accommodate the corresponding support and said chain.

14. A dam means as defined in claim 8, including:
a bracket on the underside of said lower portion connected with a tension spring to pull said lower portion back into a position of alignment with said upper portion when released;
said cable extending over a pulley to a carriage which is reciprorocable betweeen two points in a direction longitudinally of said ditch;
an endless chain and sprockets at each end of said chain, said carriage being mounted on said endless chain;
drive means including a reversible motor for moving said chain in one direction and then in the opposite direction; and
a pair of spaced limit switches engaged by said carriage at the end of movement of said carriage in the respective directions.

15. In apparatus for removing sediment and particles from water in a ditch or the like for pumping to a sprinkling system or the like, the combination of:
rotating cylindrical screen means in said ditch for removing sediment and particles from said water;
a sump separate from said ditch;
means for conveying water from the inside of said screen to said sump;
pump means having an intake in said sump for pumping water to said sprinkling system;
dam means downstream from said screen and operable in a closed position to cause water at said screen to have a depth submerging about one half or more of the screen periphery and in an open position to cause water to flush down said ditch and uncover substantially all of said screen;
means for shifting said dam means between said closed and said open positions;
means responsive to a predetermined upper level of water in said sump for actuating said shifting means to shift said dam means to said open position; and
means responsive to a predetermined lower level of water in said sump for actuating said shifting means to shift said dam means to said closed position.

* * * * *